United States Patent [19]
Gazuit

[11] 3,887,423
[45] June 3, 1975

[54] TIRE BUILDING MACHINE
[75] Inventor: Georges Gazuit, Montlucon, France
[73] Assignee: NRM Corporation, Akron, Ohio
[22] Filed: Nov. 17, 1969
[21] Appl. No.: 877,399

[30] Foreign Application Priority Data
Nov. 27, 1968 France .......................... 68.175507

[52] U.S. Cl. ................................ 156/402; 156/416
[51] Int. Cl. ............................................. B29h 17/22
[58] Field of Search .......... 156/132, 398, 400, 402, 156/416

[56] References Cited
UNITED STATES PATENTS
2,409,974  10/1946  Breth et al. .......................... 156/132
3,093,531  6/1963  Frohlich et al. ..................... 156/400
3,234,070  2/1966  Pouilloux ............................ 156/416

*Primary Examiner*—Stephen C. Bentley
*Attorney, Agent, or Firm*—Donnelly, Maky, Renner & Otto

[57] ABSTRACT

A tire building machine for the production of radial or conventional tires utilizing a ply turning and stock applicator mechanism at each end of the drum which includes a plurality of pivotally mounted fingers which pivot to turn the ply and move axially when pivoted to stitch the ply or stock, an annular distensible bladder being provided stretched over the fingers, the outer end of each finger being provided with rollers for engagement with the interior of the bladder.

16 Claims, 6 Drawing Figures

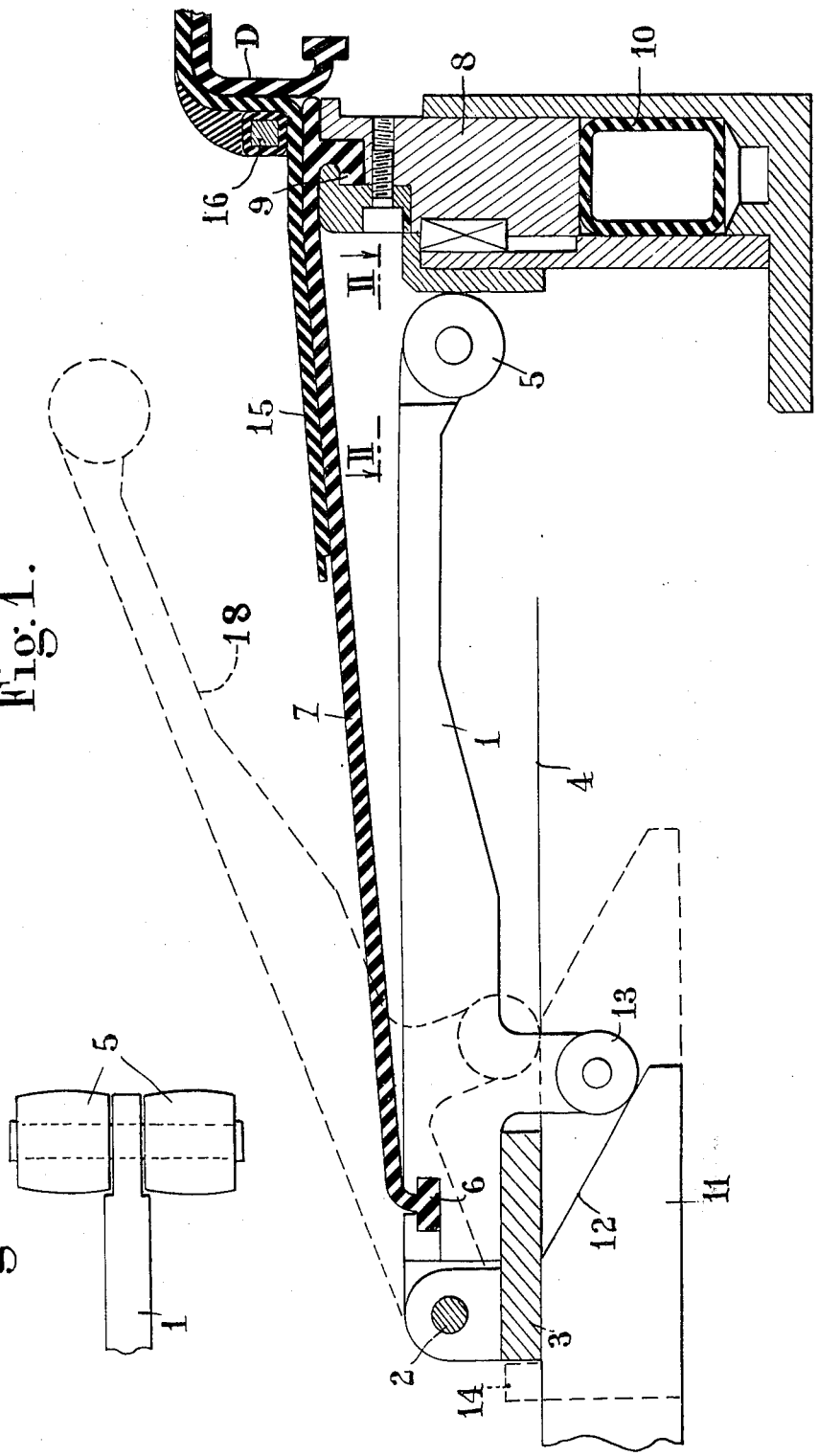

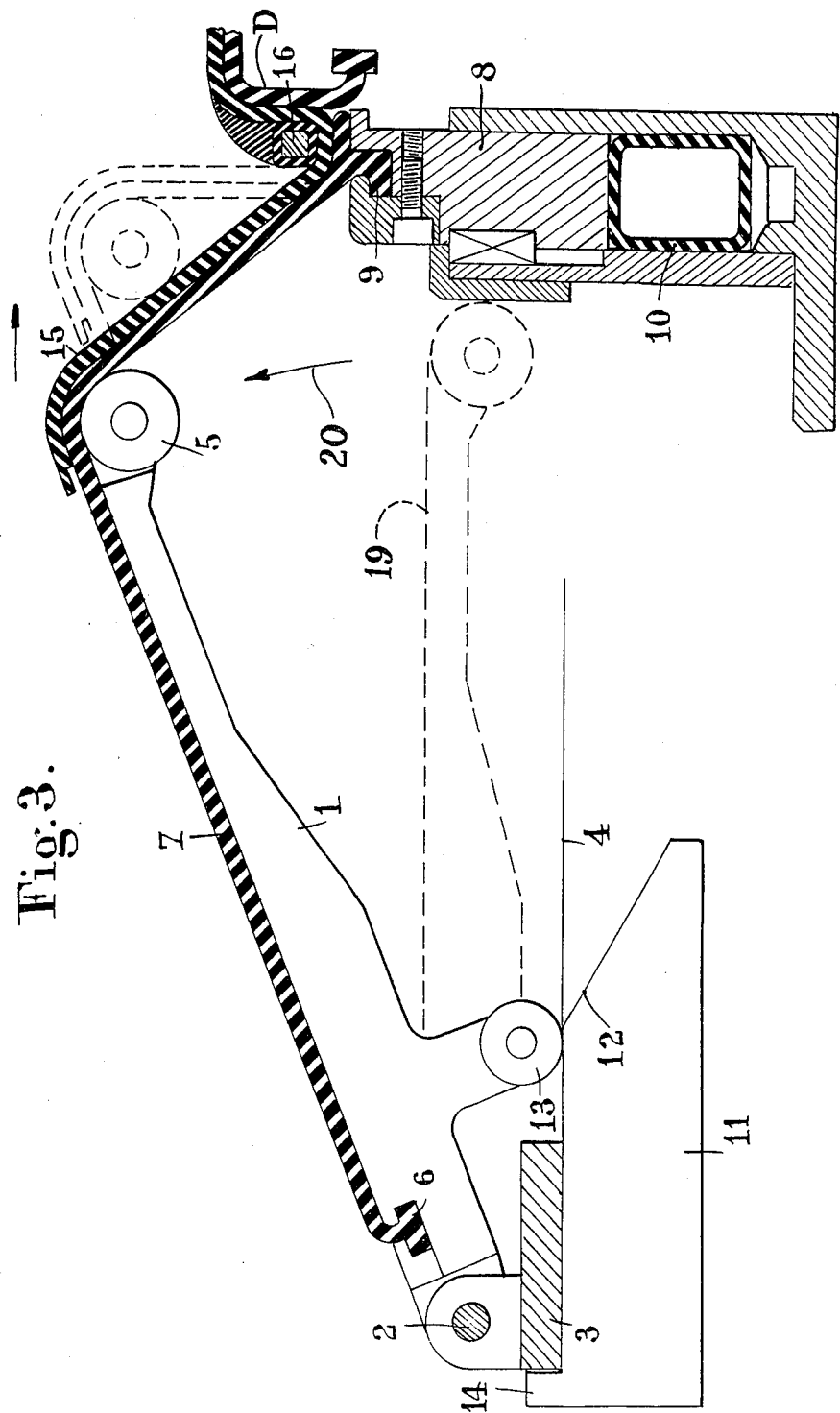

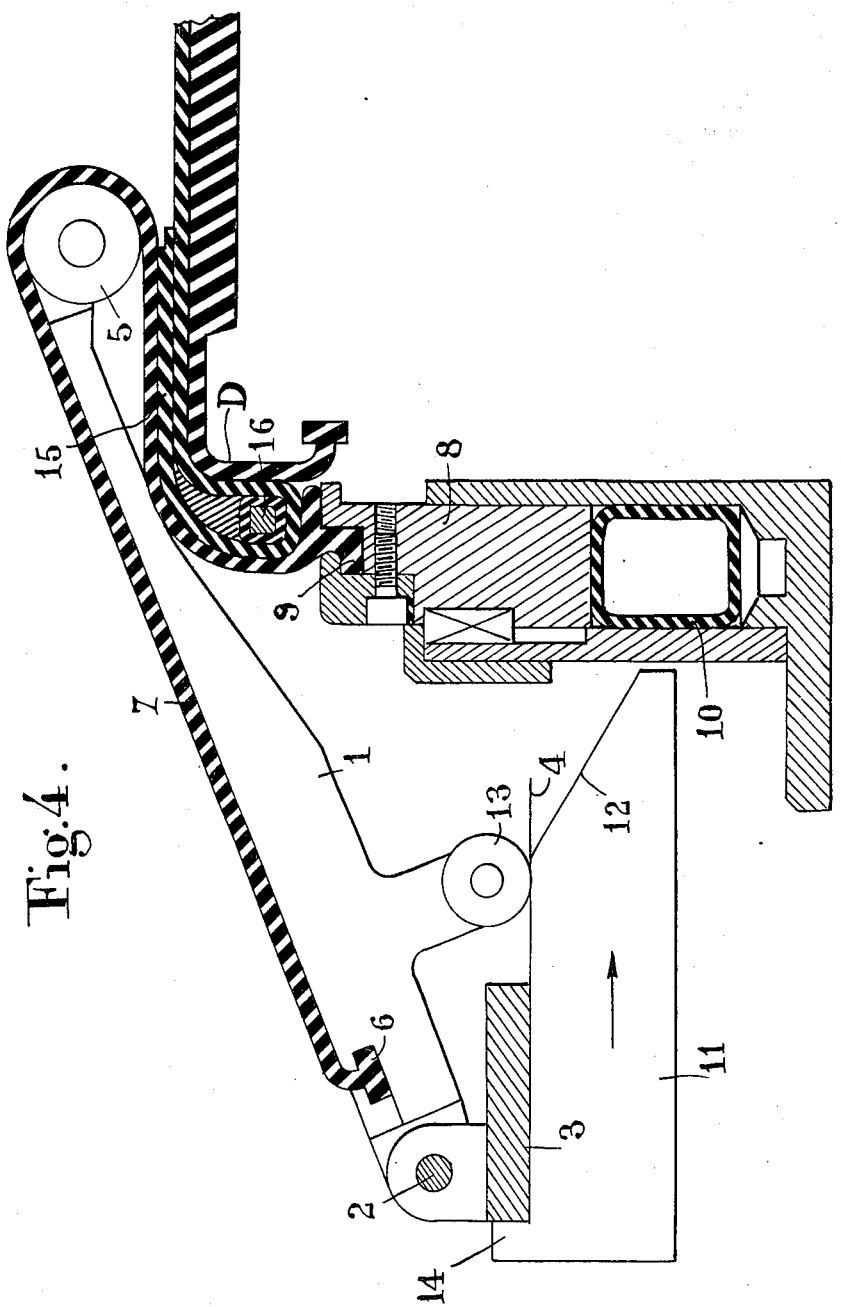

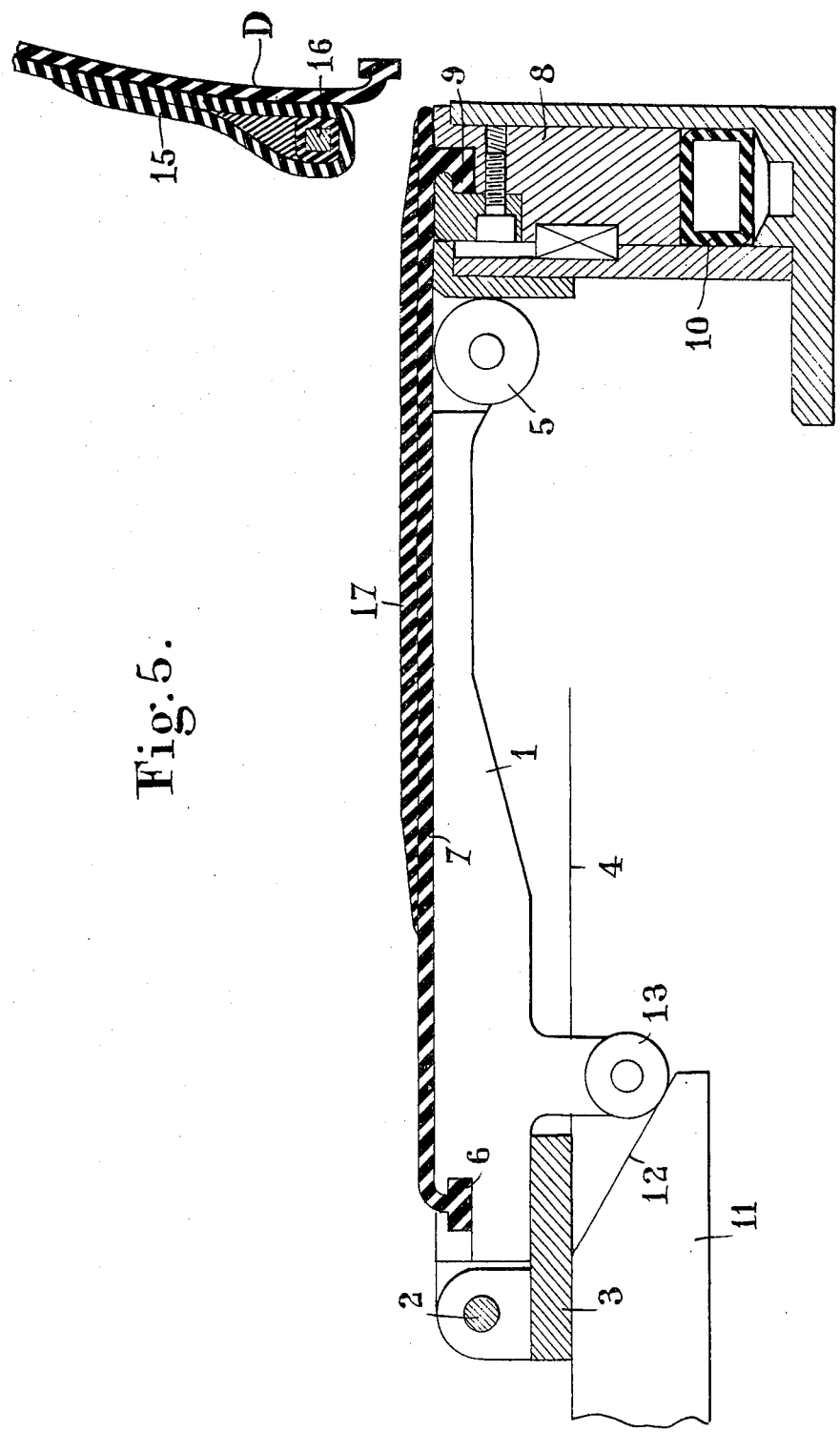

3,887,423

TIRE BUILDING MACHINE

This invention relates generally as indicated to a tire building machine and more particularly to a tire building machine having an improved ply turning and stock applicator mechanism finding utility in the construction of radial or belted tires as well as conventional tires.

In the construction of tires, both belted and conventional, one of the more complex jobs to be performed by a tire building machine is the turning of the plies around the bead structure and stitching the same with a smooth continuous application of pressure both longitudinally and circumferentially of the tire carcass. It is also highly desirable that this be accomplished without time consuming relative rotation between the ply turning and stitching mechanism and the drum and without the requirement for substantial manual dexterity or skill on the part of the operator.

It is accordingly a principal object of the present invention to provide a tire building machine incorporating an improved mechanism for the turn up of the ply stock over the beads and the stitching of the same to the center section of the carcass.

Another principal object is the provision of a tire building machine having an improved ply turn up and ply lock mechanism obtaining a smooth continuous application of the plies about the bead both longitudinally and circumferentially.

Still another important object is the provision of such mechanism in a tire building machine which can accomplish such ply turning and stitching without relative rotation between such mechanism and the drum.

A further object is the provision of a tire building machine utilizing a ply turning and stock applicator mechanism which includes a plurality of pivotally mounted fingers which are movable axially of the drum following pivoting.

A still further object is the provision of such mechanism which includes a flexible bladder stretched from the ends of the fingers toward the end of the drum to obtain a smooth, continuous application of the plies or tire material to the carcass on the drum.

A yet further object is the provision of such mechanism wherein such fingers include rollers on the distal ends thereof which roll without slipping on the interior surface of the bladder.

Still another object is the provision of such mechanism utilizing the combination of pivotally mounted and axially movable fingers and a bladder, such fingers distending the bladder to increase the pressure on the tire materials.

Other objects and advantages of the present invention will become apparent as the following description proceeds.

To the accomplishment of the foregoing and related ends, the invention, then, comprises the features hereinafter fully described, the following description and the annexed drawings setting forth in detail certain illustrative embodiments of the invention, these being indicative, however, of but a few of the various ways in which the principles of the invention may be employed.

In said annexed drawings:

FIG. 1 is a fragmentary axial section illustrating the ply turn up and material stitching mechanism at one end of the drum machine with the elastic bladder and one of the plurality of actuating fingers of such mechanism in rest position preceding turn up;

FIG. 2 is a fragmentary detail taken substantially on the line II—II of FIG. 1 illustrating the pair of rollers on the distal end of each finger;

FIGS. 3 and 4 are views similar to FIG. 1 illustrating respectively an intermediate position and the final position of such fingers at the end of turn up and ply lock onto the center section of the drum;

FIG. 5 illustrates the position of the mechanism following turn up and ply lock to receive a tire side wall or other material.

Figure 6:
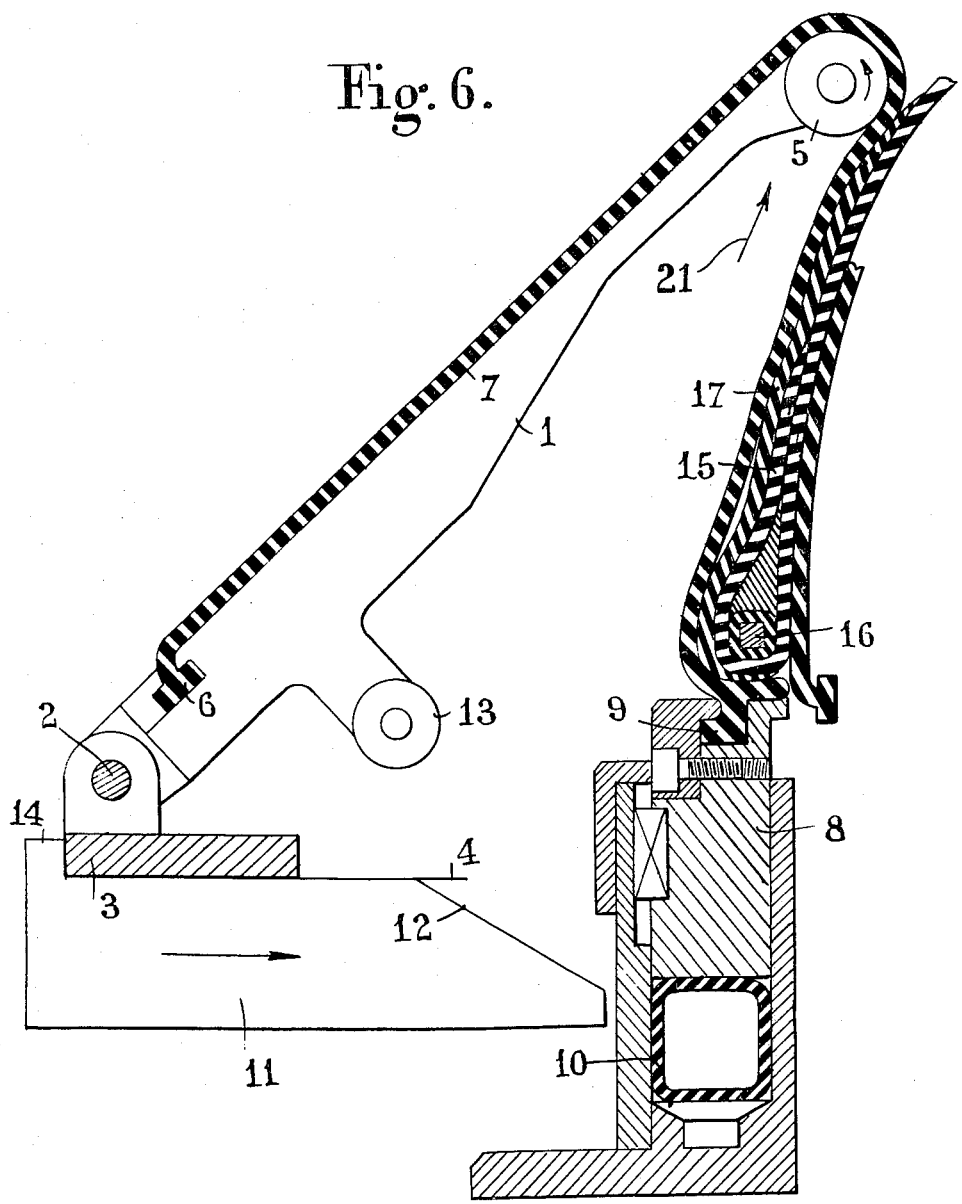
FIG. 6 illustrates the final application of such side wall or other material to the carcass.

The stock turning and stitching mechanism at each end of the drum consists of a series of fingers 1, variable in number depending on the drum diameter. Each finger at its proximal end is pivoted at 2 on a circular ring 3, the interior of which is slidably positioned on the exterior surface 4 of the annular part 11, which is mounted for movement toward and away from the end of the drum, such movement being obtained, for example, by a piston-cylinder assembly, not shown.

Each finger of the mechanism is provided at its distal end with a pair of rollers 5, one roller being provided on each side of the finger. As seen in FIG. 2, each roller is slightly crowned and the peripheral surface thereof is at least tangent to the top surface of the finger. The underside of each finger is recessed as indicated in FIG. 1 so that the rollers 5 project substantially inwardly of such undersurface of the fingers.

At the proximal end of each finger, one beaded edge 6 of bladder 7 is clamped. The annular bladder 7 which is clamped in such manner to the proximal end of each of the fingers of the mechanism extends along the outer or top surface of such fingers and is clamped to radially movable bead ring sectors 8, as indicated, the other or inner end of the bladder 7 being shaped as indicated at 9 to facilitate such clamping. It is noted that the bladder includes a lip extending beyond the shaped bead 9 and thus the bladder completely covers the outer surface of the bead ring sectors 8.

As seen in FIG. 5, in the rest position of the mechanism the bladder 7 is in the form of a right circular cylinder being connected at the outer end to the proximal ends of the fingers and at the inner end to the radially movable bead ring sectors 8. Radial movement of the bead ring sectors 8 is obtained by applying pressure to the annular chamber 10 causing the sectors to move, for example, from the FIG. 5 to the FIG. 1 position.

As seen in FIG. 1, ply stock 15 is placed on the drum D and extends down over the shoulder thereof. A bead 16 of the carcass is placed against such ply stock with the latter being between the bead and the shoulder of the drum D. Air pressure is now applied to the chamber 10 radially expanding the sectors 8 forcing the inner end of the bladder 7 against the ply stock 15 and the bead 16 of the carcass.

The axially movable part 11 is provided with a tapered cam surface 12 cooperating with cam follower or roller 13 mounted on the inwardly extending projection of each finger. Accordingly, the axial motion of the part 11 obtained by the noted piston-cylinder assembly, for example, causes, as shown in FIG. 3, the follower 13 to move up the inclined cam surface 12 thus raising the finger to the position shown in dotted lines in FIG. 1 at 18 or as shown in full lines in FIG. 3. Such limited movement of the part 11 as seen in FIG. 3 causes the fingers to move from the phantom line position 19 in the direction of the arrow 20 to the full line position shown. It will be appreciated that this raising of the fingers may be obtained by mechanisms other than the cam mechanism illustrated such as, for example, a piston-cylinder assembly.

With the fingers 1 elevated as shown in FIG. 3, the bladder 7 assumes the form seen and depresses the overhang or edge of the ply material in towards the center of the drum against the bead 16.

As the part 11 continues to move axially inwardly, a flange 14 thereon engages the outer edge of the ring 3 and moves the ring 3 and fingers 1 in toward the center of the drum D. The bladder 7 as shown in FIG. 4 has then turned the ply 15 up over the bead 16 with a pressure which increases with elongation or distention of the bladder 7. A smooth continuous application of the plies 15 about the bead both longitudinally and circumferentially is thus obtained without relative rotation between the drum and the turning and stitching mechanism. Moreover, the turning and stitching of the plies is obtained efficiently and in a very short period of time.

During the axial motion of the turning and stitching assembly between the positions shown in FIGS. 3 and 4, the rollers 5 roll without slipping on the interior surface of the bladder to maintain distention of the bladder substantially uniform throughout. At the completion of the ply turning and stitching operation as seen in FIG. 4, the fingers are retracted to their FIG. 1 position.

In the construction of non-belted or conventional tires, additional tire materials may be applied to the tire carcass thus formed, the drum D collapsed and the carcass removed from the machine. However, in the construction of radial or belted tires wherein the carcass is pre-formed to substantially tire shape, such as shown in Allitt U.S. Pat. No. 3,184,361 the turning and stitching mechanism may be employed as in FIGS. 5 and 6. In the position shown in FIG. 5, the bead ring sectors 8 have been retracted to idle position and the finger assembly 1 with the bladder 7 thereabout presents a right circular cylindrical surface, uniform and rigid, upon which may now be placed additional elements of the tire such as side walls 17. Even in such idle condition, the bladder will still be in a slightly distended condition. The splicing of such elements 17 may be completed and the drum D at this time is now expanded, such expansion being accomplished by the mechanism, for example, shown in applicant's copending application, Ser. No. 617,658, filed Feb. 21, 1967 for "Manufacture of Radial Carcass Tires" now abandoned in favor of applicant's continuation application Ser. No. 28,281, filed Apr. 22, 1970, entitled "Tire Building Machine." When the drum is expanded, the beads 16 of the tire move axially toward each other as do the bead ring sectors 8 and the ply turning and stitching assemblies. Again reference may be had to applicant's above-noted copending application for a more complete disclosure of such a drum structure.

Now, to apply the tire side walls 17 to the carcass, the bead ring sectors 8 are expanded and the part 11 is moved axially toward the end of the drum. This pivots the fingers 1 and continued movement of the part 11 moves the proximal pivot of the fingers 1 toward the end of the drum with the fingers and bladder 7 assuming the position seen in FIG. 6 with the rollers 5 moving away from the drum centerline in the direction of the arrow 21 seen in FIG. 6. The rollers 5 ride up the side wall of the carcass distending the bladder 7 and this procedure results in a smooth and uniform application of the side wall to the carcass. The part 11 is retracted, the fingers 1 are returned to their normal position, the bead ring sectors 8 are then returned to their idle position, the drum D is collapsed and the finished tire removed therefrom, following application of all of the tire elements.

It is believed apparent that the ply turning and stitching assembly may be utilized for the turning and stitching of plies about the bead and also the application of material such as tire side walls. Moreover, such mechanism may be used in the production of non-belted tires or in the production of pre-shaped or belted radial tires. In the production of the latter, the turn up of the ply overhang may be accomplished before the shaping of the center section, but in any event the elastic bladder with the interior fingers is shaped to suit the carcass, such fingers being equipped with rollers which force the bladder distended against the overhang of ply for turn up. Each of the fingers of the assembly moves in two directions, i.e., a pivoting motion away from the drum axis which expands the elastic bag, followed by a lateral motion toward the centerline of the drum during which the rollers apply pressure to the elastic bladder which in turn applies pressure against the ply stock or other tire elements. During such latter movement, the fingers are free, except for the restraining force of the bladder, to move further from the drum axis and thus ride up the side of the carcass with increasing pressure.

I, therefore, particularly point out and distinctly claim as my invention:

1. In a tire building machine, a rotatable drum adapted to receive ply stock thereon, the edges of such stock extending beyond such drum and adjacent a tire bead at the end of such drum, a plurality of pivotally mounted fingers at each end of said drum, the distal ends of said fingers being axially co-extensive with such stock edges, means to pivot said fingers to cause the distal ends thereof to turn such stock edges, means then axially to move said fingers to cause such stock edges to wrap around such bead, a radially movable bead clamp operative to clamp said ply against such bead, and an elastic annular bladder extending from such bead clamp about said fingers.

2. A tire building machine as set forth in claim 1 including rollers on such fingers engageable with the interior of said bladder.

3. A tire building machine as set forth in claim 1 wherein such elastic bladder is secured to such bead clamp and extends radially beneath such bead adjacent the end of said drum.

4. A tire building machine as set forth in claim 1 wherein said elastic bladder is secured at its other end adjacent the proximal end of said fingers.

5. A tire building machine as set forth in claim 1 wherein said elastic bladder when said bead clamp is retracted and said fingers are retracted forms a right circular cylindrical surface.

6. A tire building machine as set forth in claim 1 wherein said means to pivot said fingers comprises a linear cam movable axially of said drum, and a cam follower on the interior of said fingers.

7. A tire building machine as set forth in claim 6 including means interconnecting said linear cam and said fingers to move the latter axially toward said drum following pivoting thereof.

8. A tire building machine comprising a drum, a stock turning and stitching mechanism at each end of the drum, each said mechanism including a plurality of pivotally mounted fingers projecting generally toward the drum, means to pivot said fingers, flexible means distended from the proximal ends of said fingers over the distal ends thereof toward the ends of said drum operative to engage such stock for turning and uniform stitching, said flexible means comprising an annular distensible, bladder enclosing said fingers, and roller means on the ends of said fingers operative to engage the interior of said bladder.

9. A tire building machine as set forth in claim 8 wherein said bladder is secured at its outer end adjacent the proximal end of said fingers and at its inner end adjacent the end of said drum.

10. A tire building machine as set forth in claim 8 including a radially movable bead clamp adjacent the end of said drum, and means operative to secure the inner end of said bladder to the periphery of said bead clamp.

11. A tire building machine comprising a drum, a stock turning and stitching mechanism at each end of said drum, each said mechanism including a plurality of pivotally mounted fingers projecting generally toward the drum, means operative to pivot said fingers to shift the distal ends thereof from positions radially beneath the end of the drum to positions radially beyond the drum, means axially to move said fingers toward said drum when thus pivoted, an annular distended bladder surrounding said fingers, said bladder being connected at one end adjacent the proximal ends of said fingers and at the opposite end adjacent the edge of the drum, and a radially movable bead clamp adjacent the end of said drum, said bladder being secured to the outer end of said bead clamp and underlying such bead when clamped thereagainst.

12. A tire building machine comprising a drum, a stock turning and stitching mechanism at each end of the drum, each said mechanism including a plurality of pivotally mounted fingers projecting generally toward the drum, means to pivot said fingers, and flexible means distended from the proximal ends of said fingers over the distal ends thereof toward the ends of said drum operative to engage such stock for turning and uniform stitching.

13. A tire building machine as set forth in claim 12 wherein said flexible means comprises an annular distensible bladder enclosing said fingers.

14. A tire building machine as set forth in claim 9 including means operative initially to pivot said fingers outwardly and then to move said fingers axially toward said drum.

15. A tire building machine as set forth in claim 14 wherein said fingers are free to pivot further as they move toward said drum and apply tire materials thereto.

16. A tire building machine as set forth in claim 14 wherein said stock is adapted to be expanded to final toroidal shape by said drum for the production of preformed tires, said fingers being free to pivot further upon engagement with the stock on such expanded drum.

* * * * *